US009596158B2

(12) United States Patent
Burns et al.

(10) Patent No.: US 9,596,158 B2
(45) Date of Patent: Mar. 14, 2017

(54) COMMON INFORMATION MODEL (CIM) OBJECT TRANSFER VIA REQUESTOR STATISTICAL TRACKING

(71) Applicant: Dell Products, L.P., Round Rock, TX (US)

(72) Inventors: Ross K. Burns, Cedar Park, TX (US); Santosh Kumar Bidaralli, Round Rock, TX (US); Dahir Nur Herzi, Round Rock, TX (US)

(73) Assignee: DELL PRODUCTS, L.P., Round Rock, TX (US)

( * ) Notice: Subject to any disclaimer, the term of this patent is extended or adjusted under 35 U.S.C. 154(b) by 249 days.

(21) Appl. No.: 14/330,011

(22) Filed: Jul. 14, 2014

(65) Prior Publication Data
US 2016/0013968 A1  Jan. 14, 2016

(51) Int. Cl.
*H04L 12/26* (2006.01)
*H04L 12/24* (2006.01)

(52) U.S. Cl.
CPC ...... *H04L 43/0829* (2013.01); *H04L 41/0213* (2013.01); *H04L 41/0273* (2013.01); *H04L 41/046* (2013.01); *H04L 41/048* (2013.01); *H04L 43/06* (2013.01); *H04L 43/14* (2013.01)

(58) Field of Classification Search
CPC ............. H04L 41/0213; H04L 41/0273; H04L 41/046; H04L 41/048; H04L 43/0829; H04L 43/06; H04L 43/04
See application file for complete search history.

(56) References Cited

U.S. PATENT DOCUMENTS

| 7,676,562 B2 * | 3/2010 | Reistad | H04L 41/0233 709/223 |
| 7,953,870 B1 * | 5/2011 | Reeves | H04L 41/0816 709/223 |
| 8,769,195 B2 * | 7/2014 | Yamada | G06F 11/2064 710/52 |

(Continued)

OTHER PUBLICATIONS

Wikipedia, "Common Information Model (CIM)", May 6, 2013, 3 pages.*
Wikipedia, "WS-Management", May 14, 2013, 2 pages.*

*Primary Examiner* — Brian J Gillis
*Assistant Examiner* — Amy Ling
(74) *Attorney, Agent, or Firm* — Fogarty LLP

(57) ABSTRACT

Systems and methods for Common Information Model (CIM) object transfer via requestor statistical tracking. In an illustrative, non-limiting embodiment, a computer-implemented method may include providing, via an Information Handling System (IHS), a management console for a CIM environment, wherein the CIM environment includes a plurality of hosts accessible to the console via a network, and wherein each of the hosts has remote agent(s); creating a request to collect data from the remote agent(s), wherein the request follows a Web Services-Management (WS-Man) protocol, the request specifies a timeout and a maximum number of elements to be included in the remote agent(s)' responses, and the maximum number of elements is calculated to allow the remote agent(s) sufficient time to respond to the request prior to expiration of the timeout; and transmitting the request to the remote agent(s).

20 Claims, 3 Drawing Sheets

(56) References Cited

U.S. PATENT DOCUMENTS

2009/0300199 A1* 12/2009 Burns ................ H04L 41/0266
709/230
2011/0029573 A1* 2/2011 Li ......................... H04L 12/24
707/802

* cited by examiner

COMMON INFORMATION MODEL (CIM) OBJECT TRANSFER VIA REQUESTOR STATISTICAL TRACKING

FIELD

This disclosure relates generally to computer systems, and more specifically, to systems and methods for Common Information Model (CIM) object transfer via requestor statistical tracking.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In the field of Information Technology (IT), the Common Information Model (CIM) is an open standard that defines how networked IHS devices are managed and represented. The CIM standard enables management of IHS devices, as well as other types of resources such as network and/or storage devices, independently of their manufacturer or provider. Customers may use a management console or application, which is itself hosted by an IHS, to communicate with and manage other IHSs and/or resources through the network using a CIM protocol, such as, for example, the Web Services-Management (WS-Man) protocol.

The inventors hereof have recognized that customers who use management consoles or applications would like to have network resources used efficiently by those tools, and a responsive console that takes the shortest amount of time possible to poll or inventory resources. Unfortunately, the inventors hereof have also determined that the CIM-based WS-Man protocol is particularly verbose in its payload, especially compared with other protocols such as the Simple Network Management Protocol (SNMP) or the Intelligent Platform Management Interface (IPMI). Therefore, the inventors hereof have recognized a need to optimize CIM-type communications, especially when employing the WS-Man protocol.

SUMMARY

Embodiments of systems and methods for Common Information Model (CIM) object transfer via requestor statistical tracking are described herein. In an illustrative, non-limiting embodiment, an Information Handling System (IHS) may include a Central Processing Unit (CPU); and a memory operably coupled to the CPU, the memory having program instructions stored thereon that, upon execution by the CPU, cause the IHS to provide a management console for a Common Information Model (CIM) environment, where the CIM environment includes a plurality of hosts accessible to the management console via a network, and where each of the plurality of the hosts has one or more remote agents; create, through a management console, a request to collect data from one or more of the remote agents, where the request follows a Web Services-Management (WS-Man) protocol, and where the request specifies a timeout and a maximum number of elements to be included in the one or more remote agents' responses; adjust the maximum number of elements to allow the one or more remote agents sufficient time to respond to the request prior to expiration of the timeout; and transmit the request to the one or more remote agents.

In some implementations, the devices may include at least one of computing devices, storage devices, or network devices. The one or more remote agents may include a Baseboard Management Controller (BMC). Additionally or alternatively, the one or more remote agents may include a software agent. Also, the request may include a request for login data.

To adjust the maximum number of elements, the program instructions may be configured to cause the IHS to split the request into a plurality of requests. Additionally or alternatively, to adjust the maximum number of elements, the program instructions may be configured to cause the IHS to collect CIM statistics selected from the group consisting of: host identifier, remote agent, remote agent version, CIM Object Manager (CIMOM), CIMOM version, data requested, time of request, network latency, network bandwidth, and maximum number of elements that succeeded in a previous request. Additionally or alternatively, to adjust the maximum number of elements, the program instructions may be configured to cause the IHS to calculate an optimum transfer rate based, at least in part, upon two or more of the CIM statistics. In some cases, the program instructions may be further configured to cause the IHS to note whether the transmitted request receives a successful response and to adjust the maximum number of elements of a subsequent request based upon the note.

In another illustrative, non-limiting embodiment, a computer-implemented method may include providing, via an IHS, a management console for a CIM environment, where the CIM environment includes a plurality of hosts accessible to the management console via a network, and where each of the plurality of the hosts has one or more remote agents; creating, through the IHS, a request to collect data from one or more of the remote agents, where the request follows a WS-Man protocol, and where the request specifies a timeout and a maximum number of elements to be included in the one or more remote agents' responses, and where the maximum number of elements is calculated to allow the one or more remote agents sufficient time to respond to the request prior to expiration of the timeout; and transmitting the request, by the IHS, to the one or more remote agents.

In some cases, the request may include a request for login data. The method may also include splitting the request, by the IHS, into a plurality of requests. To adjust the maximum number of elements, the method may include collecting CIM statistics selected from the group consisting of: host identifier, remote agent, remote agent version, CIMOM, and CIMOM version; and calculating an optimum transfer rate based, at least in part, upon the CIM statistics. Additionally or alternatively, to adjust the maximum number of elements, the method may include collecting CIM statistics selected from the group consisting of: time of request, network latency, network bandwidth; and calculating an optimum transfer rate based, at least in part, upon the CIM statistics. Additionally or alternatively, to adjust the maximum number of elements, the method may include calculating the maximum number of elements based upon the optimum transfer rate; identifying a previous maximum number of elements that succeeded in a previous request; and preemptively backing off from the calculated maximum number of elements to approach the previous number of elements in the absence of a timeout error.

In yet another illustrative, non-limiting embodiment, a non-transitory computer-readable medium may have program instructions stored thereon that, upon execution by a CPU within an IHS, cause the IHS to: provide, via an IHS, a management console for a CIM environment, where the CIM environment includes a plurality of hosts accessible to the management console via a network, and where each of the plurality of the hosts has one or more remote agents; create, through the IHS, a request to collect data from one or more of the remote agents, where the request follows a WS-Man protocol, and where the request specifies a timeout and a maximum number of elements to be included in the one or more remote agents' responses, and where the maximum number of elements is calculated to allow the one or more remote agents sufficient time to respond to the request prior to expiration of the timeout; and transmit the request, by the IHS, to the one or more remote agents.

The request may include a request for login data, and the program instructions, upon execution by the CPU, may further cause the IHS to split the request into a plurality of requests. To adjust the maximum number of elements, the program instructions, upon execution by the CPU, may further cause the IHS to collect CIM statistics selected from the group consisting of: host identifier, remote agent, remote agent version, CIMOM, and CIMOM version; and calculate an optimum transfer rate based, at least in part, upon the CIM statistics.

In some cases, to adjust the maximum number of elements, the program instructions, upon execution by the CPU, may further cause the IHS to: collect CIM statistics selected from the group consisting of: time of request, network latency, network bandwidth; and calculate an optimum transfer rate based, at least in part, upon the CIM statistics.

Additionally or alternatively, to adjust the maximum number of elements, the program instructions, upon execution by the CPU, may further cause the IHS to: calculate the maximum number of elements based upon the optimum transfer rate; identify a previous maximum number of elements that succeeded in a previous request; and preemptively back off from the calculated maximum number of elements to approach the previous number of elements in the absence of a timeout error.

In some embodiments, an IHS operated by a human user may perform one or more of the techniques described herein, at least in part. In other embodiments, these techniques may be performed by an IHS having a processor and a memory coupled to the processor, the memory including program instructions stored thereon that, upon execution by the processor, cause the IHS to execute one or more operations. In yet other embodiments, a non-transitory computer-readable medium may have program instructions stored thereon that, upon execution by an IHS, cause the IHS to execute one or more of the techniques described herein.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

In various embodiments, systems and methods for Common Information Model (CIM) object transfer via requestor statistical tracking may be implemented in an Information Handling System (IHS) configured to provide a management console or application in a CIM environment. Various techniques described herein may be designed to improve and/or to optimize communications between console and agent through statistical tracking of several parameters at the console, which in turn allows the console to obtain the most amount of data in the fewest or at least reduced number of network requests while also allowing for pro-active back-off of requests in a perceived congested network environment.

From Wide Area Networks (WANs) to Local Area Networks (LANs), a CIM management console configured using the systems and methods described herein may be capable of tailoring data requests based on the quality of the communication pipe to each remote host/agent. Should the user so desire, these systems and methods also allow for the console to automatically pull the most (inventory) data at a time when it perceives the lowest network congestion.

Figure 1:
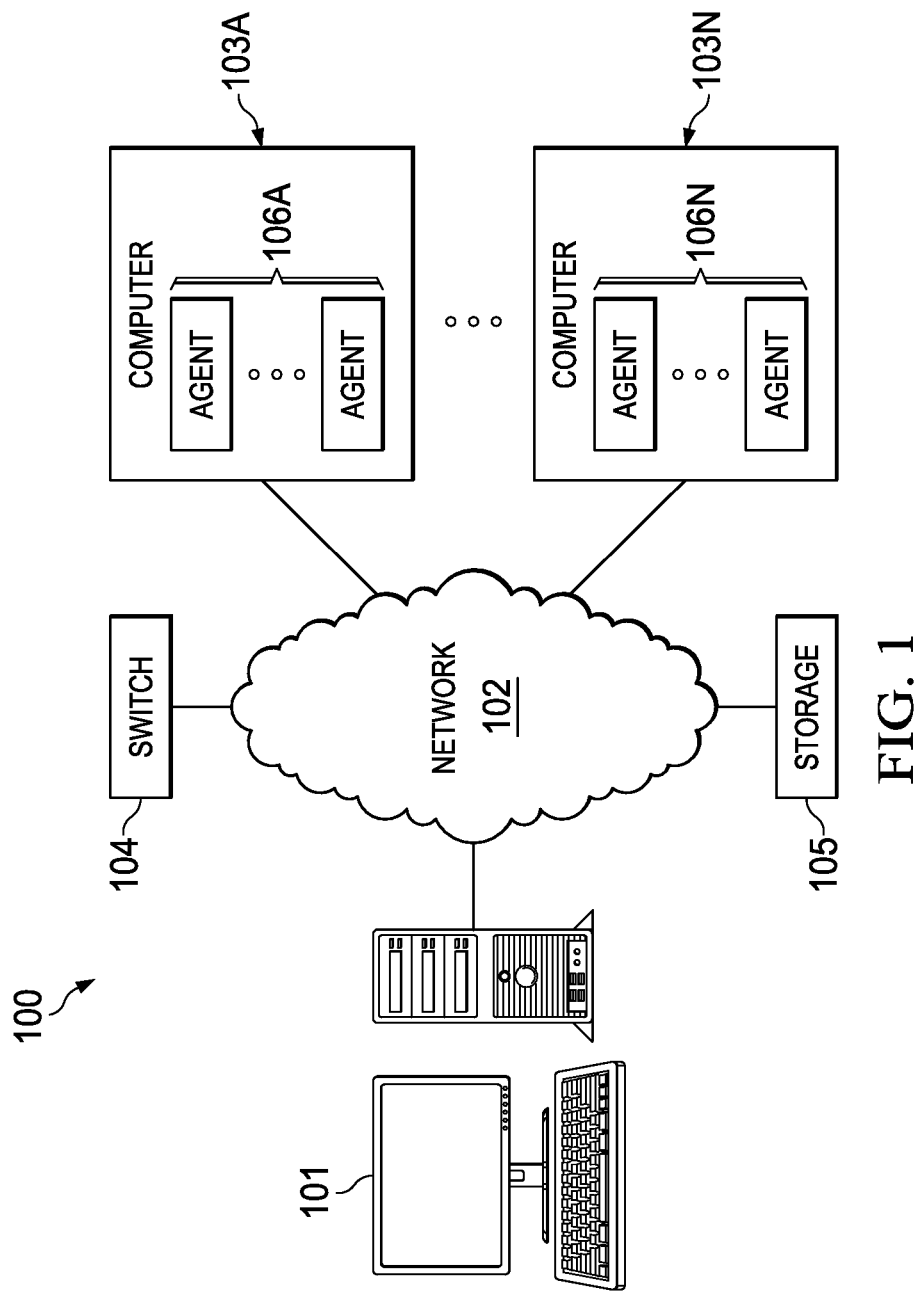
FIG. 1 is a diagram illustrating an example of an environment where systems and methods for Common Information Model (CIM) object transfer via requestor statistical tracking may be implemented according to some embodiments.

FIG. 1 is a diagram illustrating an example of environment 100 where systems and methods for Common Information Model (CIM) object transfer via requestor statistical tracking may be implemented. Particularly, IHS 101 is communicatively coupled via network 102 to IHSs 103A-N, network device 104, and storage system 105. In some embodiments, IHS 101 may be configured to implement a CIM management console accessible to a human user (e.g., a systems administrator) via a graphical user interface or the like. Moreover, such a management console may be configured to manage devices or "hosts" 103-105 remotely by sending and receiving messages using a CIM protocol, such as, for instance, the Web Services-Management (WS-Man) protocol.

Hosts 103A-N may include servers or the like, each having one or more remote agents 106A-N. In some cases, a given one of remote agents 106 may include a hardware-based agent, such as, for example, a Baseboard Management Controller (BMC), an integrated DELL® Remote Access Controller (iDRAC), or the like. Additionally or alternatively, a given one of remote agents 106 may include a software agent.

Examples of network devices 104 that may be managed by IHS 101 include, but are not limited to, gateways, routers, network bridges, switches, hubs, repeaters, protocol converters, bridge routers, proxy servers, firewalls, network address translators, multiplexers, network interface controllers, wireless network interface controllers, modems, ISDN terminal adapters, line drivers, wireless access points, etc. Conversely, examples of storage systems 105 that may also be managed by IHS 101 include, but are not limited to, Direct-attached storage (DAS), network-attached storage (NAS), storage area network (SAN), etc. In various implementations, each of hosts 104-105 may have one or more remote agents (not shown).

IHS 101's management of hosts 103-105 may take place, at least in part, using the WS-Man protocol. As used herein, the term WS-Man refers to a Distributed Management Task Force (DMTF) open standard defining a Simple Object Access Protocol (SOAP)-based protocol for the management of servers, devices, applications and various Web services. More information regarding the WS-Man protocol may be found in DMTF Standard Publication Identifier No. DSP0226.

Using the WS-Man protocol, the console provided by IHS 101 may be configured to collect one or more statistics during its operation cycle of collecting data from remote agents 106A-N and/or hosts 103-105. These statistics may include, for example:

- Host identifier or individual management access point that the communication is directed at ("H");
- Remote agent and agent version, given that different agents and versions of those agents can vary how they respond to the request ("A");
- CIM Object Manager (CIMOM) and CIMOM version, included in "A" as necessary, if not implied or included in A;
- Type of data requested ("D");
- Time of request ("T"). For the time index, time buckets may be formed which approximately line up with the recurring cycles. In this context, a "cycle" is marked by the start of a series of data requests from many hosts. For example, an "inventory cycle" may occur every 10 hours;
- Network latency and/or bandwidth, which may include a remote agent's processing time ("N"); and
- a maximum object request number that succeeded in a previous operation ("O").

As described in more detail below, the aforementioned statistics may be used as a predictor for future operations. Accordingly, a statistical model may be built as:

[H][A][D][T] =O, N

In some cases, the statistical model may be partially filled-in before any operations take place with a given host, given previously known empirical results or constants.

In some embodiments, the "MaxElements" attribute used in the WS-Man protocol may be employed to request multiple objects in one transfer; otherwise each object would be requested at a time. If the remote agent and/or host does not support use of the MaxElements attribute, calculations involving the number of objects to request may be skipped, but network latency may still be recorded for predictive analysis on the best time pull data.

In most cases, however, the capability to support multiple object transfer may be assumed to constant across like remote agents "A." An absolute maximum number of objects per request (O(Max)) may be defined system-wide or per known agent at setup of the statistical model, such that the request does not go above this amount. Although not mandatory, this approach may keep transfer responses reasonable and the statistical model more predictable. The Optimal Object Transfer Rate (OOTR), previously referred to as "O," is known as the number of objects that may be requested and transferred without error to complete the data request (may still require multiple network trips tom complete request).

As mentioned before, if multiple object transfer is not supported by the remote agent, the OOTR may not be calculated and the MaxElements may be set to "1" or omitted. A "challenge cycle", or a cycle where the steady state is challenged may increase this amount to test if this condition is still true. Moreover, the statistical sampling rate may approximately equal the frequency the data is queried from the host, known as the "cycle." In some cases, there may be fewer samples at the cost of reduced accuracy.

An approximate steady state for the OOTR, which is the mean of multiple OOTR values in this model, may be reached where the number of objects requested in one operation will be achieved consistently without error or timeout time after time. Once a steady state has been found, it may periodically be challenged (in the "challenge cycle") with a requested object count above the steady state. If the data retrieval request succeeds cycle after cycle, it may become the new steady state. A challenge cycle may occur 1 in every 10 cycles, for example, which allows for a ramp-up and changing network/agent conditions.

Also, a "challenge cycle" may be signaled to occur from observing an increase in throughput in the last round (it is not recommended to start a challenge cycle in the middle of a round of data retrieval requests of various data types, as not all types would benefit, namely those that are first or early in the data retrieval round). Additionally or alternatively, a challenge cycle may be designated for a specific time of day and/or day of week, represented by "T", whereas the model may record the new OOTR only for that time slot in which the cycle occurs, taking into account varying, but repeatable, network conditions based on network congestion patterns. Furthermore, the OOTR in the current round may typically be based on the OOTR in the previous round, but may also be affected by network latency in the current round versus previous rounds. If network latency or other factors are seen as limiting the actual versus estimated OOTR, a challenge cycle may not occur.

It should be noted, as a general matter, that not all statistics listed above are mandatory. As a person of ordinary skill in the art may recognize in light of this disclosure, it is possible to derive a various assortment of equations to model the OOTR. Nonetheless, for sake of simplicity of explanation, the techniques described below include a simple set of equations based on mean, average, and standard deviation.

Figure 2:
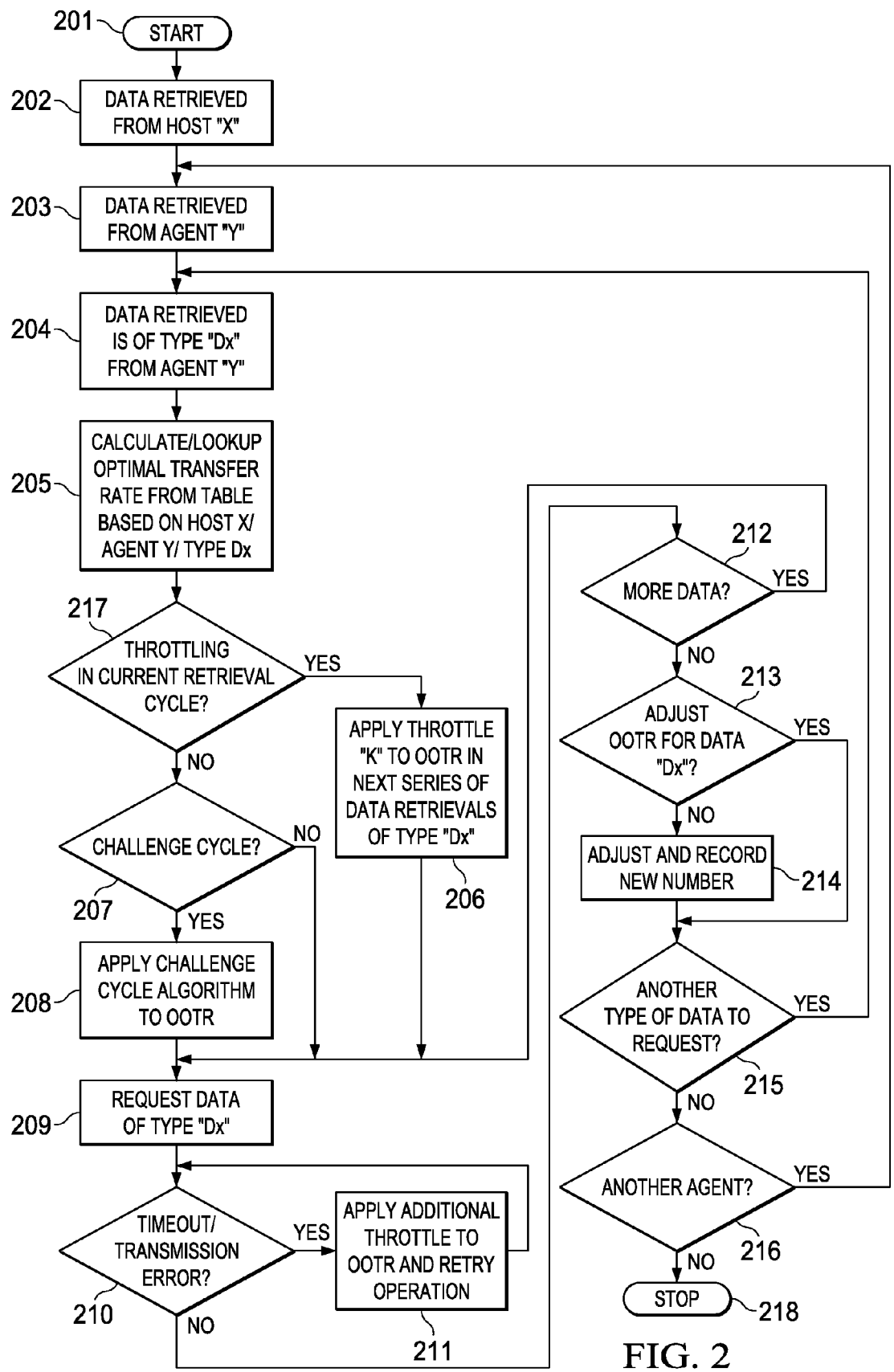
FIG. 2 is a flowchart of an example of a method for CIM object transfer via requestor statistical tracking according to some embodiments.

FIG. 2 is a flowchart of an example of a method for CIM object transfer via requestor statistical tracking. In some embodiments, method 200 may be performed, at least in part, by IHS 101 of FIG. 1 implementing a CIM management console. Particularly, method 200 provides a high-level flow of how to track and apply the statistics mentioned above. It may be assumed that, if an O(max) is defined, a statistical seed value below O(max) is used for the OOTR. This seed value may be pre-programmed or pre-determined based on certain parameters or empirical data (agent, network latency, etc.).

Method 200 beings at block 201. At block 202, method 200 includes selecting a host ("host X") to communicate with. Host X may have one or more remote agents (e.g., agent(s) 106 in FIG. 1) configured to use the WS-Man protocol. As such, at block 203, method 200 includes selecting a given agent ("agent Y") to retrieve information from. "Agent Y" may offer one or more types of data (or classes) that may be retrieved. At block 204, method 200 includes selecting a given class type ("Dx") to retrieve the objects of.

At block 205, method 200, determine if, for "host X", "agent Y", data type "Dx", a pre-emptive back-off from the retrieved OOTR is needed, known as co-efficient "K". "K"

is a multiplier to the current OOTR, and if has a value less than 1, as determined by examining the OOTR and Network Bandwidth of previous data type requests in the current data retrieval cycle at block 217, then throttling is in effect. This throttling co-efficient, applied at block 206, is a pre-emptive back-off adjustment based off of predicted versus actual observations until this point, to help assure a successful operation on the first attempt on the next data type request, and as such may not always be needed. As an approximation of the back-off for the next operation, an example algorithm is as follows.

For the current data retrieval cycle, for the Host "X", Agent "Y", taking the average of all previously requested data types' "Actual_OOTR" divided by "Expected_OOTR" values up until the current dataset retrieval of data type "Dx" will typically reveal a fraction in the range between 0 and 1. A fraction smaller than 1 means throttling was needed; a value of "1" indicates no throttling was needed; a value above "1" indicates greater throughput and may signal a challenge cycle should occur. The resulting number from this calculation is "M", which indicates the probability of hitting the current OOTR based on previous retrieval numbers in the current cycle.

For many small preceding datasets (of various types), the calculation of a back-off throttle based solely on OOTR may not yield an accurate back-off for a much larger dataset of type Dx, as the OOTR may always be hit for these smaller datasets (resulting in "M"=1). Therefore, taking network bandwidth comparisons into account can increase the accuracy of predicting a successful OOTR in the current data retrieval cycle. The fraction of network bandwidth available in this round of queries ("N") is given by the inverse of the average actual network latency divided by the average previous network latency for each of the retrieved datasets of various types until the current dataset of type "Dx"). This results in a throttle if latency is seen to be larger than expected.

If latency is less than expected, and "M" is 1 or greater, then could signal that a challenge cycle should occur. Note that, if network latency was to vary widely from retrieval to retrieval, then this number may not be a valid predictor and may be thrown out. The multiplication of M and N results in throttle co-efficient "K". In this case, the "New OOTR" may be given by the "Previous OOTR" (that is, the OOTR value calculated/retrieved in block 205) multiplied by "K". In other words, block 206 may provide a simple equation of how the predicted number of objects that can be requested is impacted by what has been observed so far versus what was predicted in OOTR and Network Bandwidth. If N fluctuates widely, an additional co-efficient may be used to lessen its impact before calculating into "K".

At block 208, method 200, if a challenge cycle is to occur, it may be calculated as follows to test for a number above the previous OOTR Mean as follows. First, let A=Mean(Previous OOTR)+1 standard deviation of previous OOTR). If A equals Mean(Previous OOTR)), then repeat for +2, +3 standard deviations. If A still equals Mean(Previous OOTR), then make A=Mean(Previous OOTR)+(Y %*Mean(Previous OOTR)), where Y may be a selected value (e.g., 5%, 10%, 20%, etc.). Finally, take OOTR=Min(A,O(Max)), if an O(Max) is defined.

At block 209, method 200 may include making the request for data with the calculated OOTR. In some cases, multiple requests may be made to get all objects as the OOTR may be less than the total number of objects wanted of type Dx. Then, at block 210, method 200 determines whether an error (due to request too large) or timeout has occurred. If so, control passes to block 211 where a back-off is applied. For example, the back-off may be similar to the "challenge cycle" discussed above such that:

A=Mean(Previous OOTR)−1 standard deviation of previous OOTR)

If A equals Mean(Previous OOTR)), then repeat for −2, −3 standard deviation. If A still equals Mean(Previous OOTR), then: A=Mean(Previous OOTR)−(Y %*Mean(Previous OOTR)) where Y may be a selected value (e.g., 5%, 10%, 20%, etc.). Finally, take OOTR=Max(A,1). Or, the back-off may be calculated according to the algorithm in block 205, with the substitution of numbers obtained from previous data type requests by the numbers obtained by previous requests of the current data type "Dx".

If method 200 determines at block 210 that no error has occurred and that the operation may be completed without error, block 212 determines if more objects are available to be retrieved for the current request. This loop may be repeated for n times, where the OOTR*n is greater than or equal to the total number of objects available in the request.

At block 213, method 200 determines the resultant OOTR, which is an average of all the n count OOTR values collected during the successful loop iterations between blocks 209 and 212 and compares it to the original OOTR, determined at block 205. If the data retrieval operation is completely successful and the resultant OOTR value is different, it is recorded as the OOTR for that data request cycle for host "X", agent "Y", data type "Dx" at block 214. Additionally, method 200 records the average network latency at block 214, which may be an average of all the n count network latencies recorded during the successful loop iterations between blocks 209 and 212. If the last successful loop iteration between blocks 209 and 212 was only a partial returned payload (being less than the OOTR specified), it may be discarded from the average of numbers for latency.

At block 215, method 200 repeats the foregoing process for a different dataset of type "Dy" for "Agent Y", if applicable. At block 216, method 200 repeats the foregoing process for another agent on Host "X", if applicable. Otherwise, method 200 ends at block 218.

In addition or as an alterative to finding an optimal OOTR through the recorded statistics, the console may be further configured to find time period(s) in which network latency/congestion appears at its lowest, and to automatically figure out the best time to do large data transfers/queries. In short, the techniques used in connection with method 200 may provide a statistical model and a way to use it to predict successful and optimal queries of objects from remote agents for the console application.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 3:
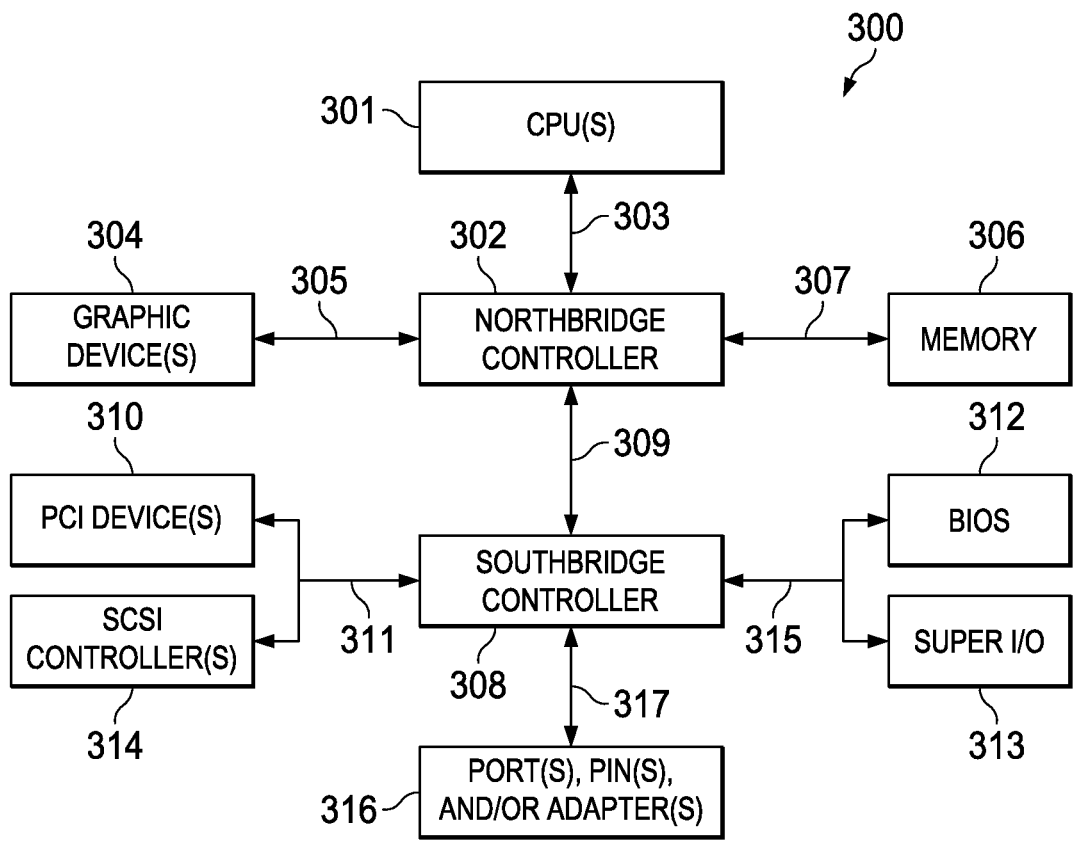
FIG. 3 is a block diagram of an example of an Information Handling System (IHS) according to some embodiments.

FIG. 3 is a block diagram of an example of an IHS. In some embodiments, IHS 300 may be used to implement devices 101 and/or 103-105 within environment 100 of FIG. 1. As shown, IHS 300 includes one or more CPUs 301. In various embodiments, IHS 300 may be a single-processor system including one CPU 301, or a multi-processor system including two or more CPUs 301 (e.g., two, four, eight, or any other suitable number). CPU(s) 301 may include any processor capable of executing program instructions. For example, in various embodiments, CPU(s) 301 may be general-purpose or embedded processors implementing any of a variety of Instruction Set Architectures (ISAs), such as the x86, POWERPC®, ARM®, SPARC®, or MIPS® ISAs, or any other suitable ISA. In multi-processor systems, each of CPU(s) 301 may commonly, but not necessarily, implement the same ISA.

CPU(s) 301 are coupled to northbridge controller or chipset 301 via front-side bus 303. Northbridge controller 302 may be configured to coordinate I/O traffic between CPU(s) 301 and other components. For example, in this particular implementation, northbridge controller 302 is coupled to graphics device(s) 304 (e.g., one or more video cards or adaptors) via graphics bus 305 (e.g., an Accelerated Graphics Port or AGP bus, a Peripheral Component Interconnect or PCI bus, or the like). Northbridge controller 302 is also coupled to system memory 306 via memory bus 307. Memory 306 may be configured to store program instructions and/or data accessible by CPU(s) 301. In various embodiments, memory 306 may be implemented using any suitable memory technology, such as static RAM (SRAM), synchronous dynamic RAM (SDRAM), nonvolatile/Flash-type memory, or any other type of memory.

Northbridge controller 302 is coupled to southbridge controller or chipset 308 via internal bus 309. Generally speaking, southbridge controller 308 may be configured to handle various of IHS 300's I/O operations, and it may provide interfaces such as, for instance, USB, audio, serial, parallel, Ethernet, or the like via port(s), pin(s), and/or adapter(s) 316 over bus 317. For example, southbridge controller 308 may be configured to allow data to be exchanged between IHS 300 and other devices, such as other IHSs attached to a network (e.g., network 104). In various embodiments, southbridge controller 308 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 308 may also enable connection to one or more keyboards, keypads, touch screens, scanning devices, voice or optical recognition devices, or any other devices suitable for entering or retrieving data. Multiple I/O devices may be present in IHS 300. In some embodiments, I/O devices may be separate from IHS 300 and may interact with IHS 300 through a wired or wireless connection. As shown, southbridge controller 308 is further coupled to one or more PCI devices 310 such as SSDs 105 of FIG. 1 as well as any number of other PCI devices (e.g., modems, network cards, sound cards, or video cards), and to one or more SCSI controllers 314 via parallel bus 311. Southbridge controller 308 is also coupled to BIOS 312 and to Super I/O Controller 313 via LPC bus 315.

BIOS 312 includes non-volatile memory having program instructions stored thereon. Those instructions may be usable CPU(s) 301 to initialize and test other hardware components and/or to load an Operating System (OS) onto IHS 300. Super I/O Controller 313 combines interfaces for a variety of lower bandwidth or low data rate devices. Those devices may include, for example, floppy disks, parallel ports, keyboard and mouse, temperature sensor and fan speed monitoring/control, among others.

In some cases, IHS 300 may be configured to provide access to different types of computer-accessible media separate from memory 306. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 300 via northbridge controller 302 and/or southbridge controller 308.

In some embodiments, service processor 102 of FIG. 1 may be implemented in IHS 300 as a distinct or discrete component coupled to southbridge controller 308 via the PCI bus. In other embodiments, service processor 102 may be mounted on a motherboard and coupled to northbridge controller similarly as one of CPU(s) 301; although still as a distinct or discrete component.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 300 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 302 may be combined with southbridge controller 308, and/or be at least partially incorporated into CPU(s) 301. In other implementations, one or more of the devices or components shown in FIG. 3 may be absent, or one or more other components may be added. Accordingly, systems and methods described herein may be implemented or executed with other IHS configurations.

It should be understood that various operations described herein may be implemented in software executed by logic or processing circuitry, hardware, or a combination thereof.

The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a Central Processing Unit (CPU); and
a memory operably coupled to the CPU, the memory having program instructions stored thereon that, upon execution by the CPU, cause the IHS to:
provide a management console for a Common Information Model (CIM) environment, wherein the CIM environment includes a plurality of hosts accessible to the management console via a network, and wherein each of the plurality of the hosts has one or more remote agents;
create, through a management console, a request to collect data from one or more of the remote agents, wherein the request follows a Web Services-Management (WS-Man) protocol, and wherein the request specifies a timeout and a maximum number of elements to be included in the one or more remote agents' responses;
calculate the maximum number of elements based, at least in part, upon a transfer rate;
adjust the maximum number of elements to allow the one or more remote agents more time to respond to the request prior to expiration of the timeout; and
transmit the request to the one or more remote agents.

2. The IHS of claim 1, wherein the devices include at least one of computing devices, storage devices, or network devices.

3. The IHS of claim 1, wherein the one or more remote agents include a Baseboard Management Controller (BMC).

4. The IHS of claim 1, wherein the one or more remote agents include a software agent.

5. The IHS of claim 1, wherein the request includes a request for login data.

6. The IHS of claim 1, wherein to adjust the maximum number of elements, the program instructions are configured to cause the IHS to split the request into a plurality of requests.

7. The IHS of claim 1, wherein to adjust the maximum number of elements, the program instructions are configured to cause the IHS to collect CIM statistics selected from the group consisting of: host identifier, remote agent, remote agent version, CIM Object Manager (CIMOM), CIMOM version, data requested, time of request, network latency, network bandwidth, and maximum number of elements that succeeded in a previous request.

8. The IHS of claim 7, wherein to adjust the maximum number of elements, the program instructions are configured to cause the IHS to calculate an optimum transfer rate based, at least in part, upon two or more of the CIM statistics.

9. The IHS of claim 8, wherein the program instructions are further configured to cause the IHS to note whether the transmitted request receives a successful response and to adjust the maximum number of elements of a subsequent request based upon the note.

10. A computer-implemented method, comprising:
providing, via an Information Handling System (IHS), a management console for a Common Information Model (CIM) environment, wherein the CIM environment includes a plurality of hosts accessible to the management console via a network, and wherein each of the plurality of the hosts has one or more remote agents;
creating, through the IHS, a request to collect data from one or more of the remote agents, wherein the request follows a Web Services-Management (WS-Man) protocol, and wherein the request specifies a timeout and a maximum number of elements to be included in the one or more remote agents' responses, and
wherein the maximum number of elements is calculated based, at least in part, upon a transfer rate and adjusted to allow the one or more remote agents more time to respond to the request prior to expiration of the timeout; and
transmitting the request, by the IHS, to the one or more remote agents.

11. The computer-implemented method of claim 10, wherein the request includes a request for login data.

12. The computer-implemented method of claim 10, further comprising splitting the request, by the IHS, into a plurality of requests.

13. The computer-implemented method of claim 10, wherein to adjust the maximum number of elements, the method further comprises:
collecting CIM statistics selected from the group consisting of: host identifier, remote agent, remote agent version, CIM Object Manager (CIMOM), and CIMOM version; and
calculating an optimum transfer rate based, at least in part, upon the CIM statistics.

14. The computer-implemented method of claim 10, wherein to adjust the maximum number of elements, the method further comprises:

collecting CIM statistics selected from the group consisting of: time of request, network latency, network bandwidth; and calculating an optimum transfer rate based, at least in part, upon the CIM statistics.

15. The computer-implemented method of claim 10, wherein to adjust the maximum number of elements, the method further comprises:

calculating the maximum number of elements based upon the optimum transfer rate;

identifying a previous maximum number of elements that succeeded in a previous request; and preemptively backing off from the calculated maximum number of elements to approach the previous number of elements in the absence of a timeout error.

16. A non-transitory computer-readable medium having program instructions stored thereon that, upon execution by a Central Processing Unit (CPU) within an Information Handling System (IHS), cause the IHS to:

provide, via an IHS, a management console for a Common Information Model (CIM) environment, wherein the CIM environment includes a plurality of hosts accessible to the management console via a network, and wherein each of the plurality of the hosts has one or more remote agents;

create, through the IHS, a request to collect data from one or more of the remote agents, wherein the request follows a Web Services-Management (WS- Man) protocol, and wherein the request specifies a timeout and a maximum number of elements to be included in the one or more remote agents' responses, and wherein the maximum number of elements is calculated based, at least in part, upon a transfer rate and adjusted to allow the one or more remote agents more time to respond to the request prior to expiration of the timeout; and transmit the request, by the IHS, to the one or more remote agents.

17. The non-transitory computer-readable medium of claim 16, wherein the request includes a request for login data, and wherein the program instructions, upon execution by the CPU, further cause the IHS to split the request into a plurality of requests.

18. The non-transitory computer-readable medium of claim 16, wherein to adjust the maximum number of elements, the program instructions, upon execution by the CPU, further cause the IHS to:

collect CIM statistics selected from the group consisting of: host identifier, remote agent, remote agent version, CIM Object Manager (CIMOM), and CIMOM version; and calculate an optimum transfer rate based, at least in part, upon the CIM statistics.

19. The non-transitory computer-readable medium of claim 16, wherein to adjust the maximum number of elements, the program instructions, upon execution by the CPU, further cause the IHS to:

collect CIM statistics selected from the group consisting of: time of request, network latency, network bandwidth; and calculate an optimum transfer rate based, at least in part, upon the CIM statistics.

20. The non-transitory computer-readable medium of claim 16, wherein to adjust the maximum number of elements, the program instructions, upon execution by the CPU, further cause the IHS to:

calculate the maximum number of elements based upon the optimum transfer rate;

identify a previous maximum number of elements that succeeded in a previous request; and preemptively back off from the calculated maximum number of elements to approach the previous number of elements in the absence of a timeout error.

* * * * *